United States Patent
DeNiro

(10) Patent No.: US 12,295,399 B2
(45) Date of Patent: May 13, 2025

(54) COMMUNION WAFER INFUSED WITH DESICCATED LIQUID AND METHOD FOR MAKING SAME

(71) Applicant: Allan Joseph DeNiro, Jasper, GA (US)

(72) Inventor: Allan Joseph DeNiro, Jasper, GA (US)

(*) Notice: Subject to any disclaimer, the term of this patent is extended or adjusted under 35 U.S.C. 154(b) by 0 days.

(21) Appl. No.: 17/480,017

(22) Filed: Sep. 20, 2021

(65) Prior Publication Data

US 2022/0087300 A1 Mar. 24, 2022

Related U.S. Application Data

(60) Provisional application No. 63/080,083, filed on Sep. 18, 2020.

(51) Int. Cl.
| | | |
|---|---|---|
| *A23P 20/10* | (2016.01) | |
| *A21D 13/24* | (2017.01) | |
| *A21D 13/36* | (2017.01) | |
| *A21D 13/45* | (2017.01) | |

(52) U.S. Cl.
CPC .............. *A23P 20/10* (2016.08); *A21D 13/24* (2017.01); *A21D 13/36* (2017.01); *A21D 13/45* (2017.01)

(58) Field of Classification Search
None
See application file for complete search history.

(56) References Cited

U.S. PATENT DOCUMENTS

| | | | | |
|---|---|---|---|---|
| 4,163,065 A | * | 7/1979 | Cilek | A21D 13/30 |
| | | | | 426/94 |
| 4,352,831 A | * | 10/1982 | Cavanagh | A21C 15/04 |
| | | | | 426/560 |
| 4,469,476 A | * | 9/1984 | Cavanagh | A21C 11/04 |
| | | | | 425/362 |
| 4,621,997 A | * | 11/1986 | Cavanagh, Jr. | A21C 11/08 |
| | | | | 425/299 |
| 2004/0253346 A1 | * | 12/2004 | Amato | A21D 13/45 |
| | | | | 426/89 |
| 2007/0131687 A1 | * | 6/2007 | Otto | B65D 51/28 |
| | | | | 220/521 |

FOREIGN PATENT DOCUMENTS

CN 103749621 A * 4/2014

OTHER PUBLICATIONS https://findingtimeforcooking.com/desserts-sweets/jam-diagonals/, Jam diagonals (Year: 2012).*

* cited by examiner

*Primary Examiner* — Jyoti Chawla
(74) *Attorney, Agent, or Firm* — Steven C. Stewart

(57) ABSTRACT

An integrated host, and method for manufacture, that provides an edible food product integrating a desiccated liquid. The integrated host allows a church attendee to partake in communion of both bread and wine from a single-use packaged product that avoids spillage of wine or other liquids. The integrated host helps to prevent the transmission of germs or other disease vectors and allows for communion "by viaticum" for those who are unable to attend church services in person.

15 Claims, 9 Drawing Sheets

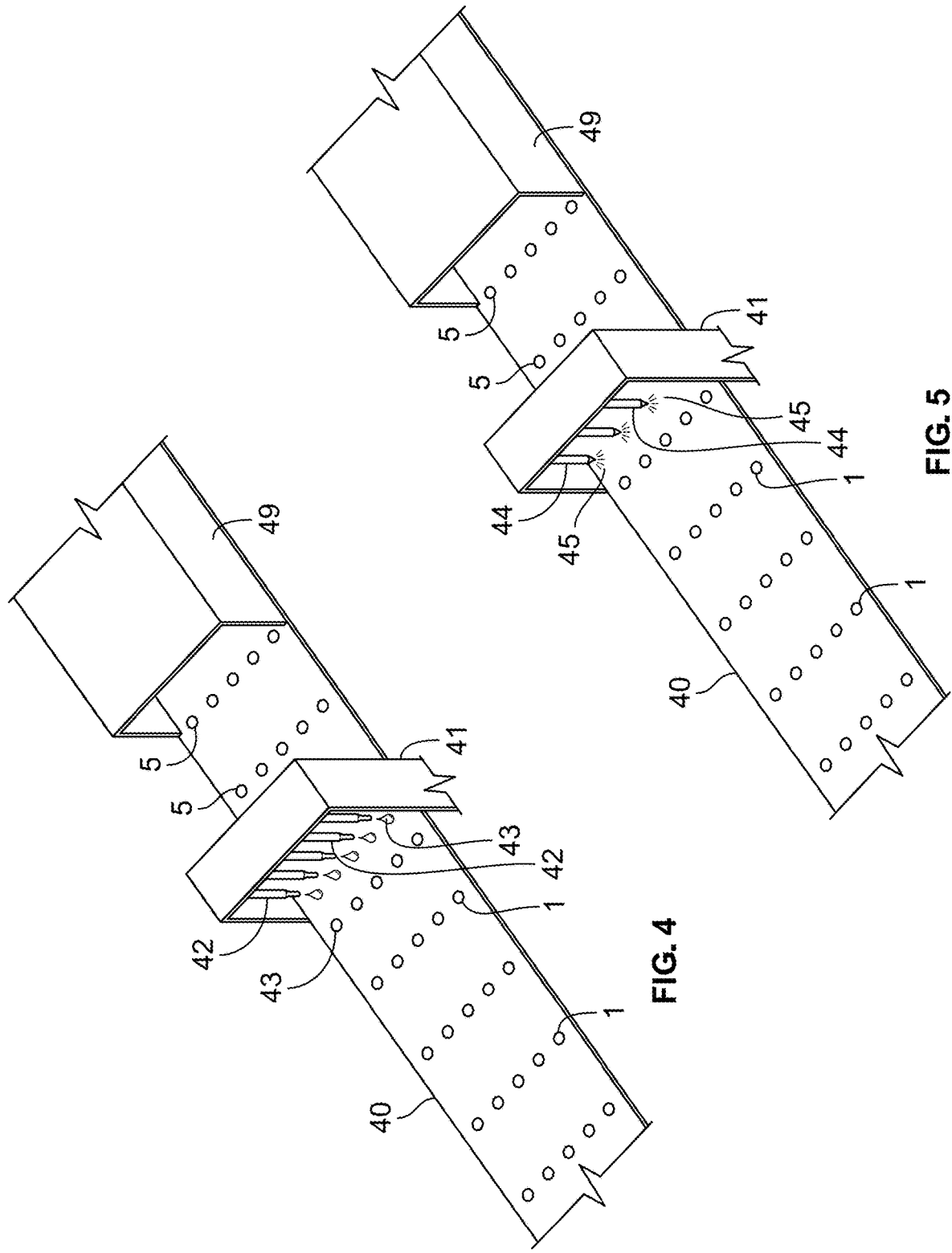

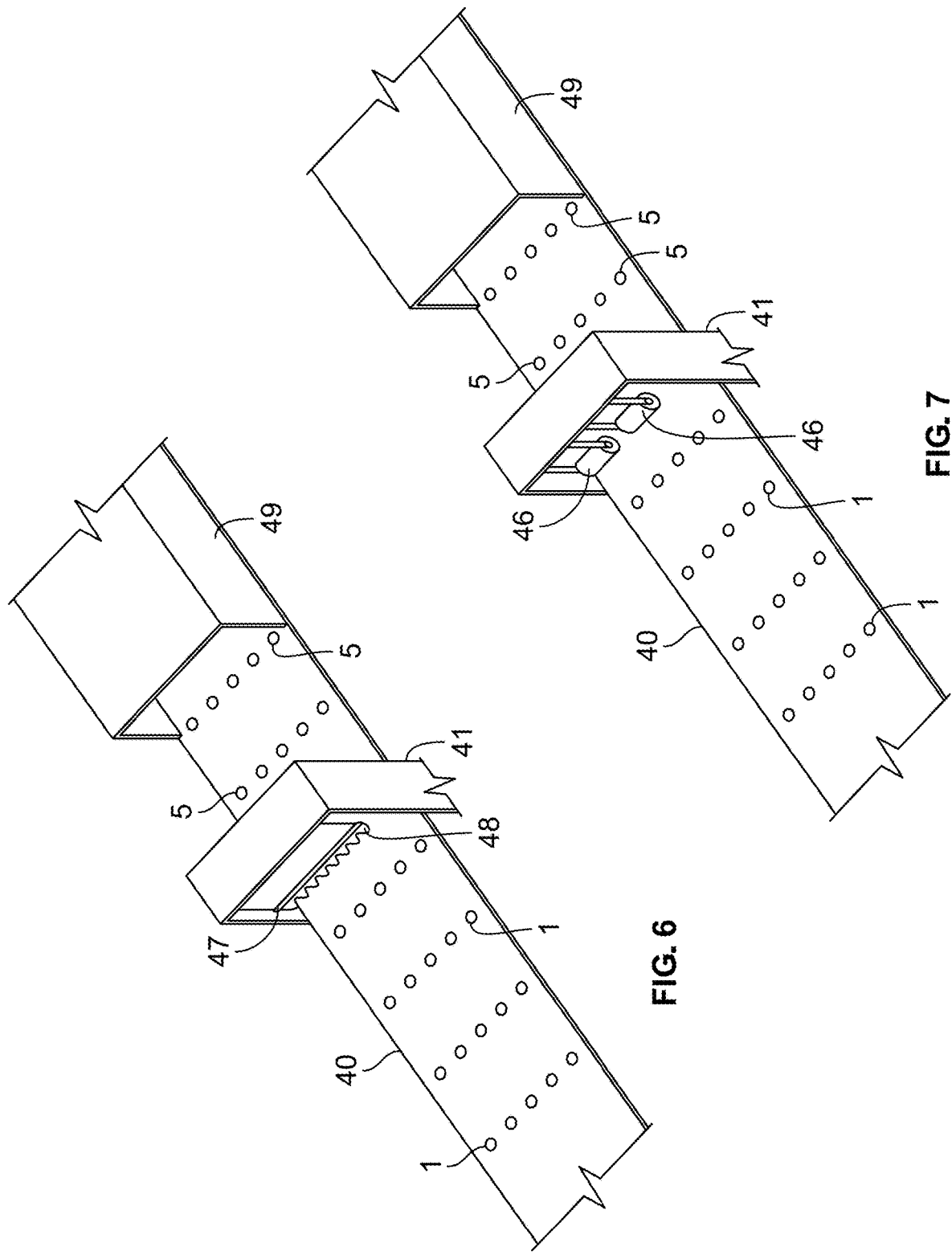

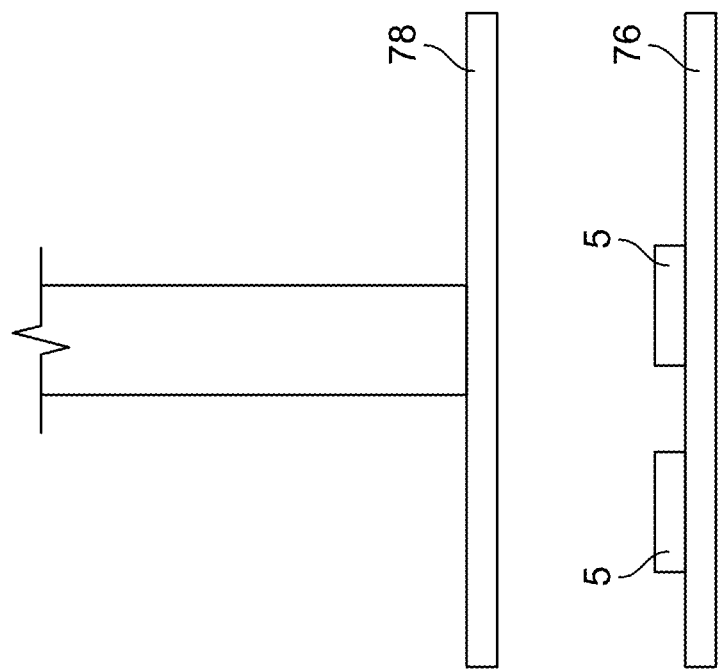
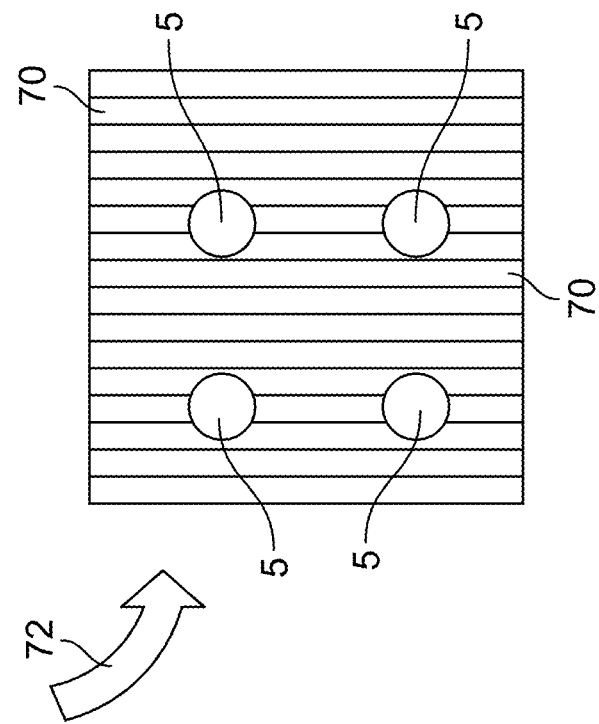

COMMUNION WAFER INFUSED WITH DESICCATED LIQUID AND METHOD FOR MAKING SAME

CROSS REFERENCE TO RELATED APPLICATIONS

The present application claims priority under 35 U.S.C. § 119(e) from U.S. Provisional Application Ser. No. 63/080,083, filed Sep. 18, 2020, entitled "Communion Host with Integrated Wine for Individual and Group Religious Ceremonies and Method for Making Same;" the disclosure of which is hereby incorporated by reference herein in its entirety.

FIELD OF THE INVENTION

The present invention relates generally to the field religious artifacts. More specifically, the invention is in the subfield of communion hosts.

BACKGROUND OF THE INVENTION

Religious services may often include a ceremony wherein worshippers receive a small amount of food or drink that is blessed by a priest or other religious figure. This service, which is often referred to as communion, involves the distribution of food, frequently in the form of small wafers of bread referred to as hosts, and drink, commonly wine. During the religious service, the hosts are distributed by one or more persons to the congregation by hand, and the wine or other drink is shared by members of the congregation out of common or individual cups. Communion may also be received "by viaticum," which means outside the presence of a church congregation or clergy member. Due to the Covid-19 crisis and the increased awareness of communicable disease, many churches and places of worship have eliminated communion from their services. Other churches have instituted procedures or precautions to allow members to receive communion while reducing the chances for the spread of disease. For example, some churches have asked members to bring their own bread and wine, or begun serving small, packaged hosts with a small cup of wine. However, these alternatives are inconvenient, and in the case of the packaged cups of wine, present a risk for spilling when a parishioner opens the packaging. There is therefore a need in the art for an effective method for delivering both bread and wine to churchgoers that is safe, reduces the chances of transmitting disease, and without risk of spills or stains.

SUMMARY OF THE INVENTION

An aspect of an embodiment of the present invention provides a wafer, portion of bread, or other small food item with an integrated amount of wine, grape juice, or other colored fluid so that a parishioner or other guest to a religious service may receive both bread and wine during a communion ceremony from a single, prepackaged product. The integrated host may be provided in a sealed container such that no one has had direct contact with the integrated host other than the individual that will consume it. As a dry food product, the integrated host allows a parishioner to partake in communion with both bread and wine in a sterile and safe manner, without the risk of spilling liquid wine that may stain clothing or cause a mess. These integrated hosts may also be customized to a particular holiday, ceremony, or personalized with the name or likeness of a person.

An aspect of an embodiment of the present invention also provides for a method of production by applying an amount of a liquid, such as wine, grape juice, or another colored liquid, to substrate such as a wafer, portion of bread, or other small food product and then drying it to produce an integrated food product. The method of production includes applying an amount of the liquid to the wafer or other food product by dropping, brushing, spraying, coating, injection, or other means. The wetted wafer or food product may then be dried by application of heat, forced air, pressure, or a combination of drying methods. The integrated wafer or food product may then be packaged for distribution to churches or individuals.

DESCRIPTION OF THE DRAWINGS

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

FIG. 4 provides a schematic illustration of an exemplary embodiment of an integrated host production process incorporating liquid droppers.

FIG. 5 provides a schematic illustration of an exemplary embodiment of an integrated host production process incorporating liquid sprays.

FIG. 6 provides a schematic illustration of an exemplary embodiment of an integrated host production process incorporating a liquid bath.

FIG. 7 provides a schematic illustration of an exemplary embodiment of an integrated host production process incorporating brushes or rollers.

FIGS. 10A and 10B provide schematic illustrations of exemplary drying processes for drying a wetted substrate.

DETAILED DESCRIPTION OF EXEMPLARY EMBODIMENTS OF THE INVENTION

Figure 1:
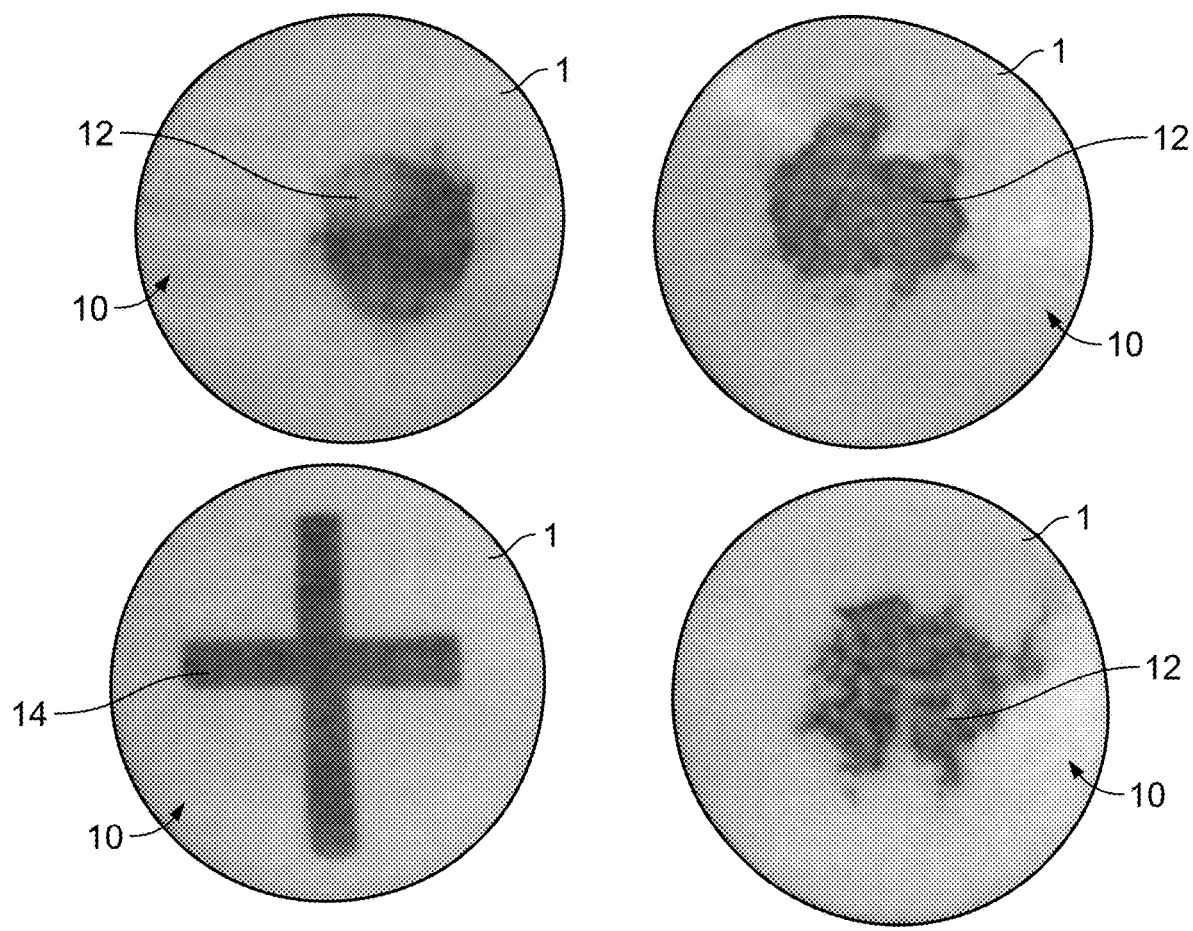
FIG. 1 provides a schematic illustration of exemplary embodiments of an integrated host.

FIG. 1 provides depictions of an integrated host 10 comprising a substrate 1 with desiccated liquid droplets 12 or a desiccated liquid design 14. The substrate 1 of the integrated host 10 may be any number of food products, but in particular may comprise a wafer, unleavened bread, bread, or any other edible substrate as desired or required for a particular application. Similarly, the desiccated liquid may be dried or desiccated wine, grape juice, water with food coloring, or any other liquid to be used to color the substate 1 to produce the integrated host 10.

Still referring to FIG. 1, the integrated host 10 may incorporate a number of features or characteristics to adapt it for use in a particular setting. For example, the substrate 1 of the integrated host 10 may include indents, grooves, or other depressions in one or more surfaces of the substrate 1. These indents, grooves, or depressions may be shaped to provide significance to the use of the integrated host 10. For example, in a religious setting, the substrate 1 of the integrated host 10 may incorporate indents, grooves, or depressions in the shape of a cross, star, heart, or any other regular or irregular shape to signify or commemorate a holiday or other event such as a wedding, funeral, birthday, or other celebrations. These indents, grooves, or depressions may then be filled or colored with desiccated liquid to make a desiccated liquid design 14. The desiccated liquid design 14 may then take on the shape of the indents, grooves, or depressions. Similarly, the desiccated liquid design 14 may also take on any number of shapes or configurations, such as a cross, heart, star, or any other shape, figure, or design of importance, significance, or to adapt the integrated host 10 to a particular setting, celebration, or use. Furthermore, the desiccated liquid design 14 may be adapted for a particular event with a custom design such as a specific date, the name or names of a person or persons for whom the event is held, or other symbols that may be meaningful at the event. The desiccated liquid droplet 12 may also take on any shape or contour as desired or required for a particular purpose. For example, the desiccated liquid droplet 12 may have a smoother or more ragged appearance to simulate a drop of blood for religious purposes. In certain embodiments, the desiccated liquid droplet 12 or desiccated liquid design 14 may cover all or any portion of the substrate 1 on one or multiple sides. It should be appreciated that the desiccated liquid design 14 or desiccated liquid droplet 12 may be integrated into the substrate 1 only on the surface of the substrate 1, or it may penetrate deeper into the substrate 1 to infuse a portion or all of the interior of the substrate 1 to make the integrated host 10, which may bring greater significance to a user who uses the integrated host 10 for religious purposes or ceremonies.

In certain embodiments, the liquid may be applied to the substrate 1 such that the weight of the liquid applied to the substrate 1 is up to about 10% of the weight of the substrate 1. More specifically, the liquid may be applied to the substrate 1 such that the weight of the applied liquid is between about 3% and about 6% of the weight of the substrate 1. However, depending on the composition and size of the substrate 1, and desired shape, design, text, image, or pattern of the desiccated liquid droplet 12 or desiccated design 14 on the finished integrated host 10, the amount of liquid applied to the substrate 1 may vary.

Figure 2:
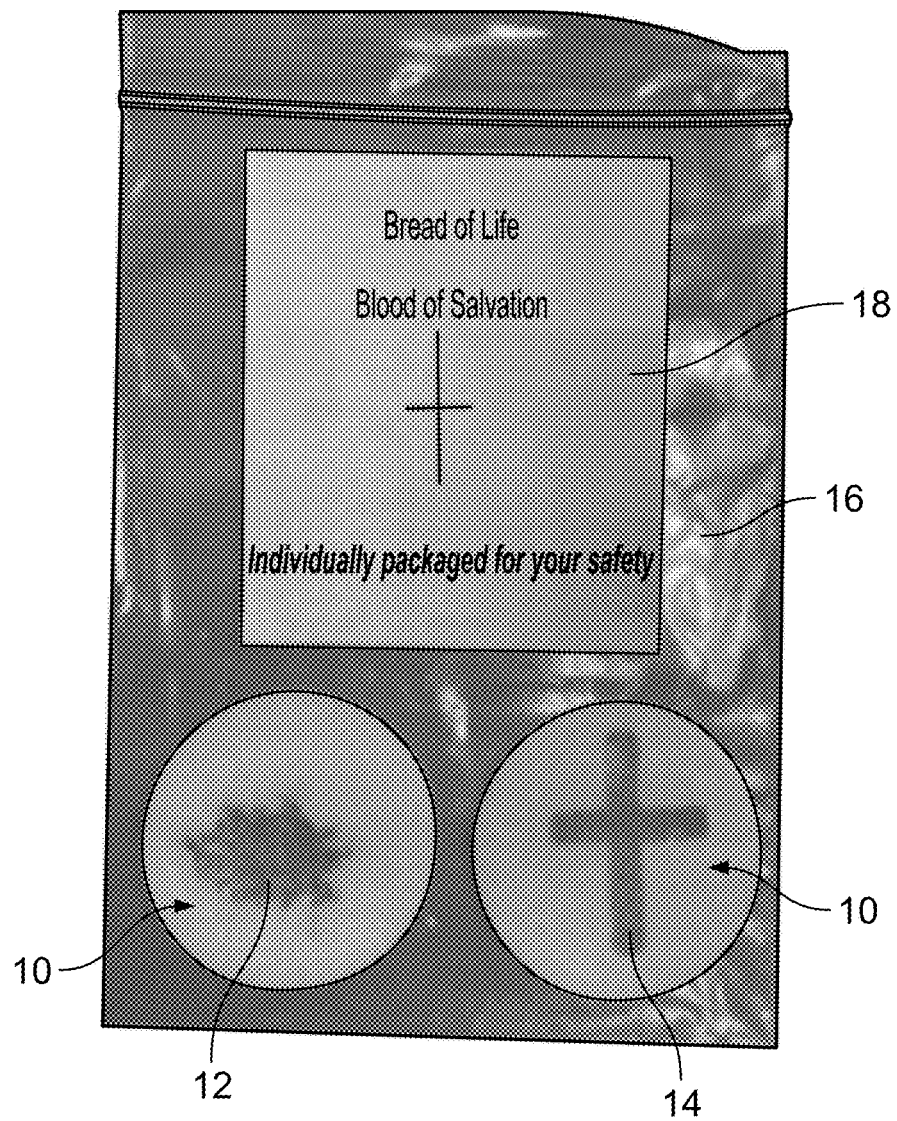
FIG. 2 provides a schematic illustration of an integrated host in a one-time use package.

FIG. 2 provides a depiction of an integrated host 10 with a desiccated liquid droplet 12 and an integrated host 10 with a desiccated liquid design 14 in packaging 16 with labeling 18. The integrated host 10 may come in any number of different packaging arrangements. For example, the integrated host 10 may be packaged individually, in pairs for use by a couple, or in any multiples for serving families or other groups who wish to partake in the integrated host 10 as a group. The packaging 16 may be a single-use package and may comprise plastic, a blister package, paper packaging, cardboard packaging, or any other type of packing material or system as allows for the safe delivery of single or small servings of a dry food product for individual consumption. The packaging 16 may also include labeling 18 with information such as ingredients, allergen information, or instructions for use. It should be appreciated that the integrated host 10, within the single-use packaging 16 or in larger package forms, may be shipped, sold or provided in bulk containers to churches or other organizations in numbers from 5 to 1,000 integrated hosts 10, or more.

Figure 3A:
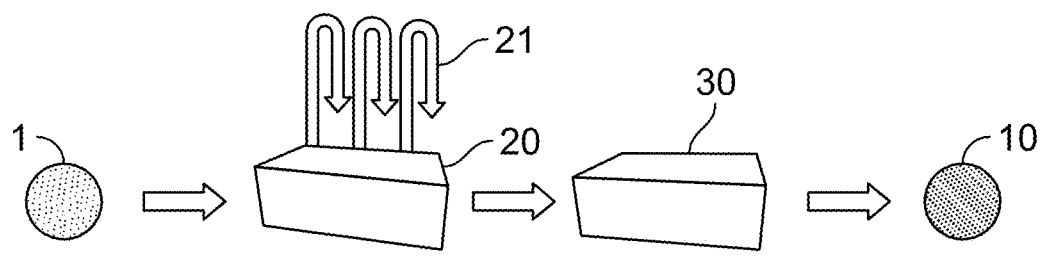
FIGS. 3A-3G provide schematic illustrations of exemplary embodiments of an integrated host production process.
Figure 3B:
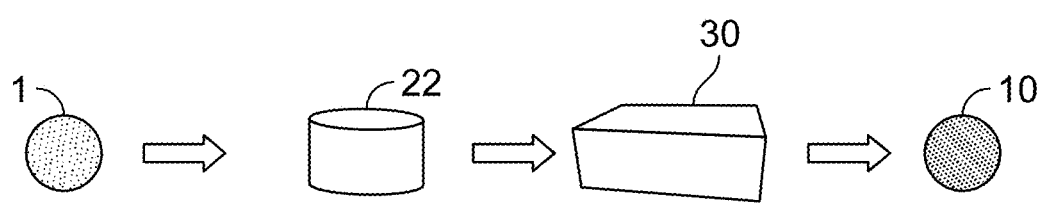
Figure 3C:
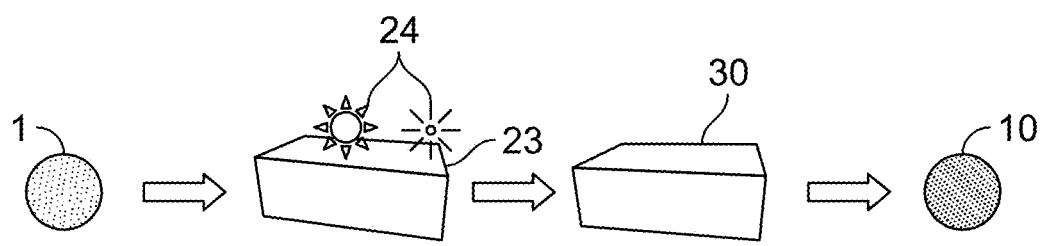
Figure 3D:
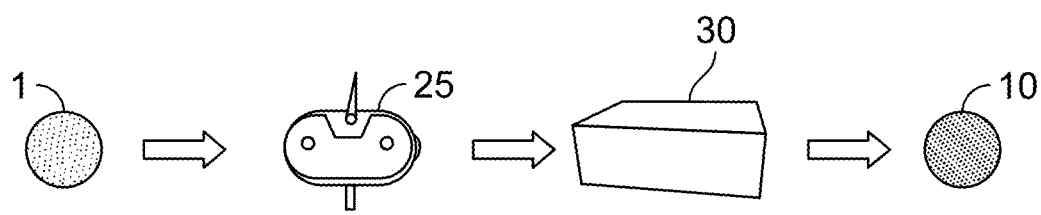
Figure 3E:
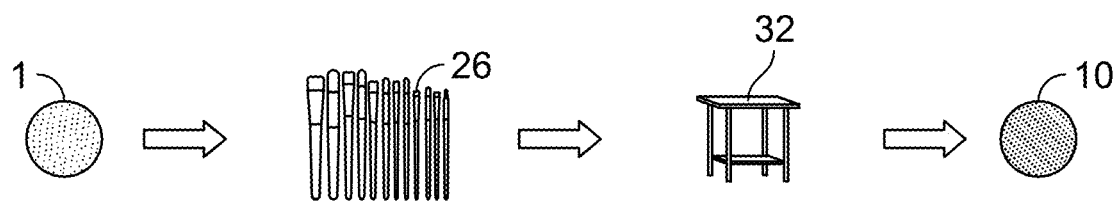
Figure 3F:
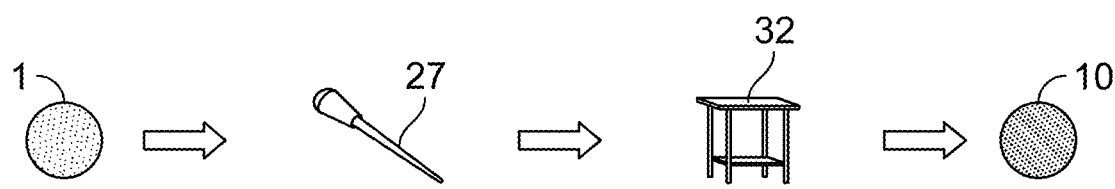
Figure 3G:
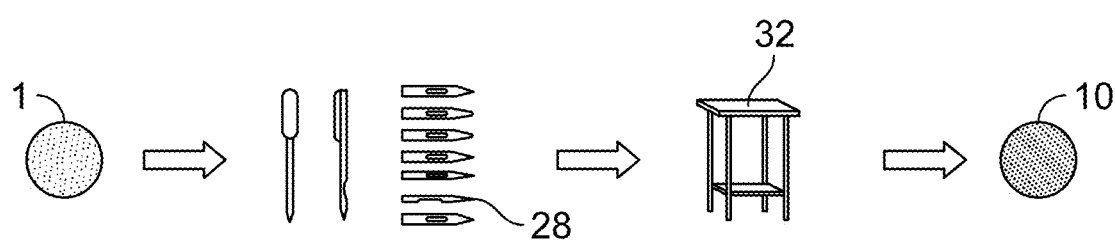

FIGS. 3A-3G provide schematic depictions of exemplary processes for producing an integrated host 10. The production process may begin with a substrate 1, which may be a pre-made wafer, unleavened bread, bread, gluten free product, or any other suitable substrate material. The substrate 1 may then have a liquid, such as wine, grape juice, water with food coloring, or another liquid to color the substrate 1, applied through various production means. For example, as shown in FIG. 3A, the substrate 1 may be placed on a spraying table 20 where sprays or jets 21 may apply the liquid to the substrate 1. As shown in FIG. 3B, the substrate 1 may pass through a coating bath 22 or cascade of the liquid to be applied. As shown in FIG. 3C, the substrate 1 may be placed on a brushing table 23 where one or more brushes 24 may apply the liquid to the substrate 1. As shown in FIG. 3D, the substrate 1 may be placed in a 3D printer 25 where the 3D printer may apply the liquid to substrate 1. As shown in FIG. 3E, the substrate 1 may have the liquid applied by hand with brushes 26. As shown in FIG. 3F, the substrate 1 may have the liquid applied with hand-held basters or droppers 27. As shown in FIG. 3G, the substrate 1 may have the liquid applied by needles 28, which may be hand-operated or machine-operated.

Still referring to FIGS. 3A-3G, the substrate 1, which is now wetted with the liquid from the application step, may be moved to a drying table 30 or a hard surface 32. It should be appreciated that in certain embodiments, the application of the liquid may be done directly on the drying table 30 or hard surface 32. The drying table 30 or hard surface 32 may be heated, either directly from below, via infrared heating elements, application of heated air, or any other type of heating, to assist in the drying and of the substrate 1 into an integrated host 10 which is coated with a desiccated liquid.

FIG. 4 provides a schematic depiction of an exemplary manufacturing process for producing an integrated host by dripping or dropping a liquid onto a substrate 1. A plurality of substrates 1 may be carried along a conveyor 40 to a liquid application apparatus 41. The liquid application apparatus 41 may include one or more droppers 42 adapted to apply droplets of liquid 43 to the substrates 1 as they pass under the liquid application apparatus 41. The liquid application apparatus 41 may include sensors or be calibrated based on the speed of the conveyor 40 and the spacing of the substrates 1 to drip liquid only when a substrate 1 is beneath a dropper 42 to receive the liquid droplet 43. It should be appreciated that the relative height of the dropper 42 to the substrate 1 may be adjusted to provide the required shape or visual signature to the spot or splotch of liquid to be applied to the substrate 1. If a more spread out and splattered appearance is desired, to simulate a drop of blood, for example, the dropper 43 may be positioned at a greater height to allow the liquid drop 43 to fall further before contacting the substrate 1. Similarly, for a smaller or more uniform spot or splotch of liquid, the dropper 42 may be placed relatively closer to the substrate 1. After the substrate 1 has received the droplet of liquid 43, the conveyor 40 will transfer the wetted substrate 5 to the drying apparatus 49.

Still referring to FIG. 4, the application of a liquid droplet 43 to a substrate 1 may be automated and performed by a liquid application apparatus 41, or it may be performed manually by hand with a hand-held baster, dropper, or other liquid delivery device. In certain embodiments, the dropper may be aimed or otherwise directed to apply liquid to an indent, groove, or depression on the substrate 1, coloring only that portion of the substrate. Furthermore, the height the liquid droplets 43 fall before contacting the substrate 1 may be adjusted depending on the type of substrate 1 used and the liquid droplets 43 being applied to the substrate. For example, the height may vary depending on whether the substrate 1 is a wafer, unleavened bread, bread, or some other substrate 1. Similarly, the height may be adjusted to account for the viscosity, density, thickness, or other characteristics of the liquid droplets 43 to be applied to the substrate 1. In certain embodiments, the height of the dropper 42 above the substrate 1 may include, but is not limited to, any one or more of any combination of the following ranges:

about 0 to about 12 inches;
about 3 to about 9 inches;
about 4 to about 8 inches; or
the dropper 42 may be held at a height of about 6 inches above the substrate 1.

FIG. 5 provides a schematic depiction of an exemplary manufacturing process for producing an integrated host by spraying a liquid onto a substrate 1. Once again, a plurality of substrates 1 may be transferred along a conveyor system 40 to a liquid application apparatus 41. The liquid application apparatus 41 may comprise one or more nozzles 44 configured to produce a liquid spray 45 directed onto the substrates 1 as they pass under or through the liquid application apparatus 41. In certain embodiments, the liquid application apparatus 41 may be configured to provide a continuous spray of liquid 45, with or without a recovery system. In other embodiments, the liquid application apparatus 41 may be configured to provide timed pulses or liquid sprays 45 only when one or more substrates 1 are in position to receive the liquid spray 45. Furthermore, the spray pattern, size of droplets, speed of the conveyor system 40, and flow rate of the liquid sprays 45 may be adjusted to provide for heavier or lighter applications of liquid to the substrates 1, differing patterns of liquid application, or different levels of coloration to the wetted substrate 5. In certain embodiments, the spray nozzles 44 may be located very close to the substrate 1 and be controlled to apply very fine or small droplets or amounts of liquid to the substrate 1 as it passes through the liquid application apparatus 41. The nozzles 44 may then be pulsed as the substrate 1 moves along conveyor 40 to only apply liquid to selected areas of the substrate 1 and make different patterns, text, images, or other visual designs on the surface of the substate 1. After the substrate 1 has passed through the liquid application apparatus 41, the wetted substrate 5 may continue along the conveyor system 40 to the drying apparatus 49.

FIG. 6 provides a schematic depiction of an exemplary manufacturing process for producing an integrated host with a liquid cascade or bath 48. A plurality of substrates 1 may be transferred along a conveyor system 40 towards a liquid application apparatus 41. The liquid application apparatus 41 may include a spreader bar 47, manifold, or other device to provide a cascading bath of liquid 48 to apply liquid to the substrates 1 as they pass under or through the liquid application apparatus 41. The flow rate of liquid over or through the spreader bar 47 may be adjusted, along with the spacing of substrates 1 along the conveyor 40 and conveyor speed, to determine the amount of liquid applied to any particular substrate 1. After the application of liquid through the cascade bath 48, the wetted substrate 5 may be transferred along the conveyor system 40 to a drying apparatus 49. In certain embodiments, the liquid application apparatus 41 may include or be configured to work with a liquid capture device to capture any excess liquid applied to the substrates 1 as they are coated.

FIG. 7 provides a schematic depiction of an exemplary manufacturing process for producing integrated hosts with a roller or brush mechanism 46. The liquid application apparatus 41 may include one or more application rollers or brushes 46 configured to apply a layer of liquid to a substrate 1 passing under or through the liquid application apparatus 41 along a conveyor 40 or other feed device. A liquid supply may be plumbed into the liquid application apparatus 41 and distributed to the one or more rollers or brushes 46 continuously or intermittently to wet the one or more rollers or brushes 46. As the substrate 1 passes under or through the liquid application apparatus 41, the roller or brush 46 will contact the surface of the substrate 1 and apply a layer of liquid. The size and number of brushes or rollers 46, number and density of bristles or nap, length of bristles or nap, and flow rate of liquid applied to the rollers or brushes 46 may be adjusted to apply the desired amount of liquid to a substrate as appropriate for any desired coloration, design, or post-application drying steps. For example, in certain embodiments, the rollers or brushes 46 may have a design or cutouts imprinted into their surface such that only a portion of the surface of the roller or brush 46 makes contact with the substrate 1. This partial contact may be shaped or otherwise configured to make any desired patterns, text, images, or other visual designs on the surface of the substate 1, or otherwise to control the application of liquid to the substrate 1, such that only portions of the surface of substrate 1 receive any liquid. After the substrate 1 has passed through the liquid application apparatus 41, the wetted substrate 5 may continue along the conveyor system 40 to the drying apparatus 49.

Figure 8:
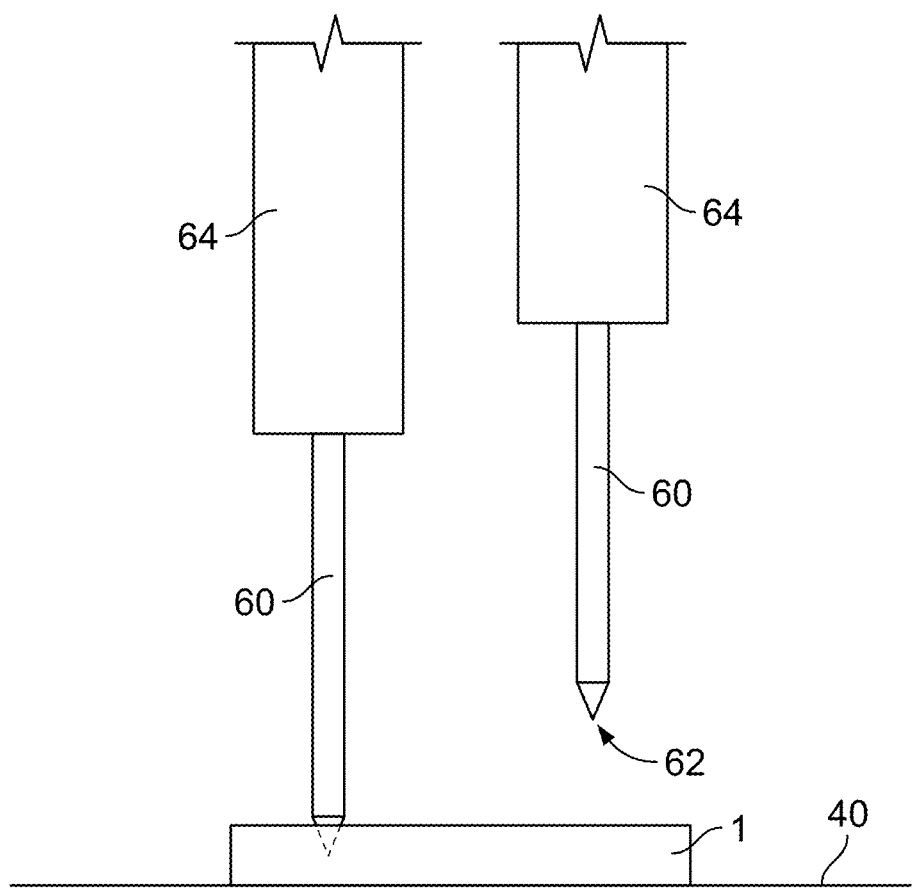
FIG. 8 provides a schematic illustration of an exemplary embodiment of an integrated host production process incorporating needles for liquid application and injection.

FIG. 8 provides a schematic depiction of an exemplary manufacturing process for producing integrated hosts with injection of a liquid with needles 60. The substrate 1 may pass along a conveyor 40 or other feed device under one or more needles 60 mounted on moveable needle heads 64. As the substrate 1 passes beneath the needles 60, the needle heads 64 may move the needles 60 into contact with the surface of substrate 1. In certain embodiments, the needles 60 may only contact the surface of substrate 1. However, the needles 60 may also pierce the surface of substrate 1 to deliver liquid to the interior of the substrate to provide improved penetration of the liquid into the interior of the substrate 1. The needles 60 may also include a needle orifice 62 to deliver the liquid onto or into the substrate 1. In certain embodiments, the size of the needle orifice 62 may include, but is not limited to, any one or more of any combination of the following ranges:

about 1.00 millimeters to about 1.25 millimeters;
about 1.05 millimeters to about 1.20 millimeters;
about 1.10 millimeters to about 1.15 millimeters; or
in any size range from about 1.00 millimeters to about 1.25 millimeters in increments of about 0.05 millimeters.

The needles 60 may be made from any number of materials. In certain embodiments, the needles 60 may comprise stainless steel, plastic, stainless steel and plastic, brass, brass and plastic, or other materials or material combinations. For certain applications of the integrated host that serve a religious purpose, the needles 60 may comprise gold, silver, or other materials that impart religious significance to the production of the integrated host or its use in religious ceremonies.

Still referring to FIG. 8, injection of the liquid into the substrate 1 may offer certain advantages in production of the integrated host. For example, the deeper penetration offered by the injection of the liquid into the substrate 1 through the needles 60 may provide a more meaningful experience to religious worshippers in that the liquid is more deeply integrated into certain types of substrates 1. The needles 60 may also be used, by moving the needle heads 64 and positioning the needles 60 relative to the substrate 1 to apply liquid selectively across the area of the substrate 1. The needles 60 may then create any desired pattern, text, image, or other visual design on the substrate 1. It should be appreciated that the needles 60 may also be hand-held or hand-operated to apply the liquid to the substrate 1.

Figure 9:
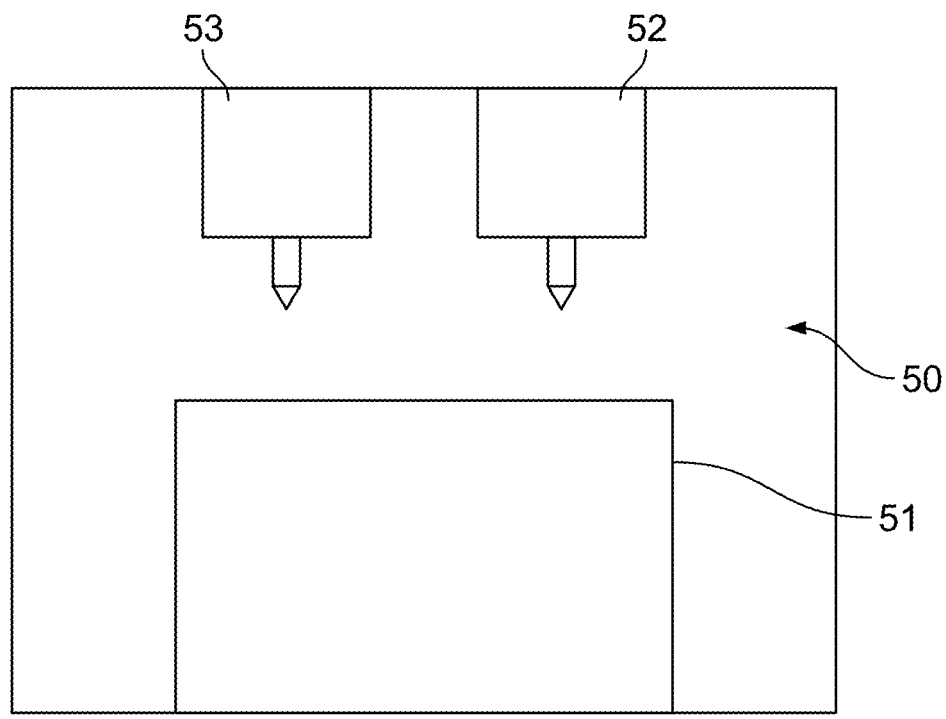
FIG. 9 provides a schematic illustration of an exemplary embodiment of an integrated host production process using a 3D printer.

FIG. 9 provides a schematic depiction of an exemplary manufacturing process for producing integrated hosts with a 3D printing system 50. As shown, a 3D printer 50 may include one or more dough moveable print heads 52 and one or more liquid moveable print heads 53 that may be fed with the constituent materials of the integrated host. For example, the dough moveable print head 52 may be fed by a reservoir of dough for production of the substrate, while the liquid moveable print head 53 may be fed by a reservoir of liquid such as wine, grape juice, or a similar material for printing a spot or splotch, design, text, or other visual image onto the substrate to create the integrated host. In certain embodiments, the moveable print heads 52, 53 may be fed liquid or semi-liquid materials, such as, though not limited to, wine or uncooked dough, for deposit onto a printing platform 51 during the printing process. These liquid or semi-liquid materials may then be cooked, hardened, or otherwise dried as the printing process progresses by heat, light, or any other suitable method. In other embodiments, the moveable print heads 52, 53 may be fed dry feedstocks, such as small grains or granules of substrate material or dried liquid material. These dry materials may then be printed into a stable form by application of a binder such as starch or another suitable, food-grade binding material. It should be appreciated that the 3D printing process may also utilize any combination of liquid, semi-liquid, or dry materials to print integrated hosts. It should be appreciated that the printing process may also be applied to an existing substrate, such as a wafer, unleavened bread, or bread, wherein the liquid print head applies the liquid to the substrate to deposit a pattern, text, image, or other visual design. The wetted substrate may then be dried through one or more drying processes as described herein.

Referring to FIGS. 3-9, the integrated host production process may begin with a standard substrate 1, such as, but not limited to, pre-made communion hosts or gluten-free communion hosts as are commonly available on the market. These pre-made hosts may then have liquid such as, but not limited to, wine, grape juice, or colored water applied to them through one or more of various processes that may include, but are not limited to, dripping, brushing, spraying, bath or cascade applications, 3D printing, injection, or any combination thereof. After the liquid has been applied to the substrate 1, the new wetted substrate 5 may require specific drying processes to remove water, alcohol, or any other volatile compounds present in the applied liquid and leave the colored residue in the form of a spot or splotch of a regular or irregular shape, a pattern, text, image, or other design.

The process for creating an integrated host may also begin with the production of the substrate 1 itself. For instance, flour and water may be combined with small amounts of salt and vinegar to create the dough for the hosts or wafers, though any suitable recipe or type of dough, including, but not limited to, gluten free, may be used. This dough may then be rolled out and cut or otherwise shaped, including any indentations, grooves, or other shapes, into the uncooked substrate 1, in this instance hosts or wafers. In certain embodiments, the liquid, such as wine or other fluid, may be applied to the uncooked substrate 1 prior to cooking so that the applied liquid may be dehydrated, desiccated, or otherwise dried out during the cooking process. In other exemplary embodiments, the uncooked substrate 1 may be baked or otherwise heated into a finished host or wafer. The finished substrate 1 host or wafer may then be used in the liquid application and drying processes as described.

Still referring to FIGS. 3-9, the flow rate, spray pattern, sizing of any application equipment, selection of pressure for the applied liquid, and any other production factors may be selected, altered, or modified to apply the appropriate amount of liquid to the substrate 1. In certain embodiments, the liquid may be applied to the substrate 1 such that the weight of the liquid applied to the substrate 1 is up to about 10% of the weight of the substrate 1. More specifically, the liquid may be applied to the substrate 1 such that the weight of the applied liquid is between about 3% and about 6% of the weight of the substrate 1. However, depending on the composition and size of the substrate 1, and desired shape, design, text, image, or pattern on the finished integrated host 10, the amount of liquid applied to the substrate 1 may vary.

FIGS. 10A and 10B provide depictions of exemplary drying processes and apparatuses for drying a wetted substrate 5 to desiccate the applied liquid and produce the finished integrated host. The drying process may take on a number of variations or steps as necessary to produce integrated hosts with optimal coloration and to minimize distortion, curling, or other deformation. For example, referring to FIG. 10A, the drying process may be carried out on trays or grates 70 in ambient air with or without exposure to light. Removal of light exposure may, in certain embodiments, lead to reduced discoloration or oxidation of the applied liquid and the integrated host. The drying process may also include the addition of forced air 72 to increase the amount of airflow over the wetted substrate 5 and may also optionally include heated air for reduced drying times.

Referring to FIG. 10B, in certain embodiments, the wetted substrate 5 may experience some distortion, curling, or deformation during the drying process into an integrated host. In such cases, the wetted substrate 5 may be pressed and heated to prevent curling and distortion during the drying process. It should be appreciated that an integrated host that has completed the drying process may also be pressed and heated to return it to a substantially flat or planar shape. For example, the wetted substrate 5 or integrated host may be placed between a heating plate 76 and a top plate 78 to apply both heat and pressure to flatten or reshape the integrated host, or dry the wetted substrate 5, although any suitable means for applying heat and pressure may be used. In certain embodiments, the heating plate 76, top plate 78, or both, may include gaps or passages to allow vapor to escape from the wetted substrate 5 or integrated host. The heating plate 76, top plate 78, or both, may also include recesses to accept the wetted substrate 5 or integrated host to assist in flattening and shaping the wetted substate 5 or integrated host while preventing splitting or damage from the heating plate 76 or top plate 78. To minimize sticking of the integrated host to the heated plates, wax paper, onion skin paper, parchment paper, cheese cloth, other textiles, or any other suitable barrier may be used.

Any particular drying method or combination of methods may be chosen based on the requirements of a particular substrate and applied liquid including, but not limited to, the recipe or composition of the substrate, its size, shape, texture, susceptibility to discoloration or distortion, and how it may interact with the particular applied liquid and the amount of liquid applied during the manufacturing process.

Referring to FIGS. 3-10, the drying apparatus 49, 70, 76, 78 may be adapted in various ways to different production methods, different types of substrate 1, different methods of application of liquid to the substrate 1, different compositions and amounts of liquid, or sizes and absorbency of substrate 1. For example, the drying apparatus 49, 70, 76, 78 may be a forced-air drying kiln that blows air, either heated or at ambient temperature, across the wetted substrates 5 as they travel down the conveyor system 40 or enter the drying stage of production. In certain embodiments, the drying apparatus 49, 70, 76, 78 may include infrared or other directed energy from above, below, or the sides to warm the wetted substrate 5 and evaporate the applied liquid. Still other variations on the drying apparatus 49, 70, 76, 78 may be utilized in the production of integrated hosts. For instance, the wetted substrate 5 may be placed between plates or other rigid devices such that pressure and heat may be applied directly through integrated heating elements or other heating methods to both dry and flatten the integrated hosts. The hosts may also be transferred to trays or grates with direct heating of the wetted substrates 5, or allowed to air dry or placed into a dehydrator or other drying machine. Once dried, the integrated hosts may then be wrapped or otherwise placed into packaging through any standard methods and prepared for shipping and distribution. During the drying process, the wetted substrate 5 or integrated host may be heated to any one or more of any combination of the following ranges:

75 degrees Fahrenheit and 120 degrees Fahrenheit;
80 degrees Fahrenheit and 115 degrees Fahrenheit;
85 degrees Fahrenheit and 110 degrees Fahrenheit;
90 degrees Fahrenheit and 105 degrees Fahrenheit;
95 degrees Fahrenheit and 100 degrees Fahrenheit; or
heated to any temperature between 75 degrees Fahrenheit and 120 degrees Fahrenheit in increments of about 5 degrees Fahrenheit. Similarly, the wetted substrate 5 or integrated host may be dried in air, either still or with forced flow, heated to any one or more of any combination of the following ranges:

75 degrees Fahrenheit and 120 degrees Fahrenheit;
80 degrees Fahrenheit and 115 degrees Fahrenheit;
85 degrees Fahrenheit and 110 degrees Fahrenheit;
90 degrees Fahrenheit and 105 degrees Fahrenheit;
95 degrees Fahrenheit and 100 degrees Fahrenheit; or
heated to any temperature between 75 degrees Fahrenheit and 120 degrees Fahrenheit in increments of about 5 degrees Fahrenheit. Particular drying temperatures or temperature ranges may be selected based on the composition of the substrate 1, composition of the applied liquid, amount of applied liquid on the wetted substrate 5, and the number, size, and spacing of wetted substrates 5 to be dried.

Still referring to FIGS. 3-10, the spacing of the substrates 1 or wetted substrates 5 during production may be adapted for a particular size or type of substrate 1 or wetted substrate 5. The spacing between the substrates 1 or wetted substrates 5 should allow for the application equipment or workers to apply the liquid to the substrates 1 without overspray or interference between adjacent substrates 1. Furthermore, during drying, the wetted substrates 5 should be spaced apart sufficiently such that there is adequate airflow and separation for even and complete drying of the wetted substrate 5 into an integrated host 10. In certain embodiments, the spacing between the substrates 1 or wetted substrates 5 may be from about 0.25 inch to about 0.75 inch. In still further embodiments, the spacing between the substrates 1 or wetted substrates 5 may be about 0.50 inches.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 5%. In one aspect, the term "about" means plus or minus 5% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particular interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

REFERENCES

The devices, systems, apparatuses, compositions, materials, and methods of various embodiments of the invention disclosed herein may utilize aspects (such as devices, apparatuses, modules, systems, compositions, materials, and methods) disclosed in the following references, applications, publications and patents and which are hereby incorporated by reference herein in their entirety (and which are not admitted to be prior art with respect to the present invention by inclusion in this section).

A. U.S. Pat. No. 4,469,476, entitled "Apparatus for Manufacturing Wafers", Sep. 4, 1984.

B. U.S. Pat. No. 4,352,831, entitled "Method for Manufacturing Wafers", Oct. 5, 1982.

I claim:

1. A packaged dry integrated host comprising:
a communion wafer with at least one surface having an observable contour, the communion wafer configured with an applied grape based liquid on a portion of the at least one surface dried to form a desiccated residue, wherein the desiccated residue showing a change in color of the portion resulting from the applied grape based liquid, and wherein the observable contour of the portion showing the change in color is identical to an observable contour of the portion of the at least one surface prior to applying a grape based liquid; and
a package enclosing the communion wafer, wherein the package comprises a shell made of a food safe material with a viewable portion through which the observable contour of the portion showing the change of color is visible,
wherein the packaged dry integrated host allows a consumer to partake in communion without spilling the grape based liquid.

2. The packaged dry integrated host of claim 1, wherein said wafer is a communion host.

3. The packaged dry integrated host of claim 1, wherein said desiccated residue comprises desiccated wine.

4. The packaged dry integrated host of claim 1, wherein said desiccated residue comprises desiccated grape juice.

5. The packaged dry integrated host of claim 1, wherein the observable contour shows at least one depression formed in the at least one surface of said wafer; and
wherein said communion wafer is configured to dispose the desiccated residue within said at least one depression.

6. The packaged dry integrated host of claim 5, wherein a shape of said at least one depression formed in the at least one surface of said wafer is selected from the group consisting of: a star, a cross, or a heart.

7. The packaged dry integrated host of claim 1, wherein said grape based liquid is applied on a portion of the at least one surface of the wafer to form desiccated material residue in a customizable configuration.

8. The packaged dry integrated host of claim 1, wherein said desiccated residue comprises desiccated wine; and wherein said desiccated residue is configured to simulate a droplet of blood on said communion wafer.

9. The dry integrated host of claim 1, wherein the communion wafer is configured with a portion of the at least one surface without the applied grape based liquid.

10. A dry integrated host comprising:
a communion wafer having at least one substrate with at least one grove, depression or indent that forms a design of a figure, image, symbol, number or letter on at least one surface of said communion wafer, a desiccated residue disposed within the at least one grove, depression or indent of the at least one substrate, the desiccated residue exhibiting a change in a color of the at least one surface of the at least one substrate forming the design to provide an observable design on the communion wafer, the desiccated residue resulting from drying a grape based liquid applied to the at least one surface of the at least one substrate.

11. The dry integrated host of claim 10, wherein said desiccated residue comprises a desiccated wine residue.

12. The dry integrated host of claim 10, wherein said desiccated residue comprises a desiccated grape juice residue.

13. The dry integrated host as recited in claim 10, wherein the desiccated residue is disposed on an interior portion of the communion wafer with a margin having no change in the color disposed between the interior portion and an outer rim of the communion wafer.

14. The dry integrated host of claim 10, further comprising a food safe package to contain the communion wafer, the food safe package having a viewable portion through which the design exhibiting the change in color is viewable.

15. The dry integrated host of claim 10, wherein the dry integrated host is packaged in a sealed individual or in a sealed multi package, wherein a portion the sealed individual or the sealed multi package encloses the communion wafer, wherein the sealed individual or sealed multi package comprises a shell made of a food safe material with a viewable portion through which the at least one grove, depression or indent of the at least one substrate exhibiting the change of color is visible, wherein the dry integrated host is operative to be removed from the sealed individual or the sealed multipackage to allow a consumer to partake in communion without spilling the grape based liquid.

* * * * *